(12) United States Patent
Orita

(10) Patent No.: US 9,273,758 B2
(45) Date of Patent: Mar. 1, 2016

(54) POWER TRANSMISSION DEVICE

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 14/135,802

(22) Filed: Dec. 20, 2013

(65) Prior Publication Data

US 2014/0194236 A1 Jul. 10, 2014

(30) Foreign Application Priority Data

Jan. 9, 2013 (JP) ................................. 2013-001654

(51) Int. Cl.
*F16H 7/12* (2006.01)
*B25J 9/10* (2006.01)
*B25J 19/06* (2006.01)
*F16H 7/08* (2006.01)

(52) U.S. Cl.
CPC .................. *F16H 7/12* (2013.01); *B25J 9/1045* (2013.01); *B25J 19/068* (2013.01); *F16H 7/1281* (2013.01); *F16H 2007/0806* (2013.01); *F16H 2007/0823* (2013.01); *F16H 2007/0874* (2013.01)

(58) Field of Classification Search
CPC . F16H 7/12; F16H 7/1281; F16H 2007/0806; F16H 2007/0823; F16H 2007/0874; B25J 19/068; B25J 9/068

USPC ................ 474/134, 112, 126; 414/680, 744.5
See application file for complete search history.

(56) References Cited

U.S. PATENT DOCUMENTS

| | | | | | |
|---|---|---|---|---|---|
| 1,001,053 | A | * | 8/1911 | Lane | 474/126 |
| 1,704,778 | A | * | 3/1929 | Webb | 474/126 |
| 2,502,768 | A | * | 4/1950 | Wachsman | 474/110 |
| 2003/0224889 | A1 | * | 12/2003 | Luh | 474/134 |
| 2005/0181901 | A1 | * | 8/2005 | Shin et al. | 474/134 |
| 2009/0186726 | A1 | * | 7/2009 | Van Maanen | 474/110 |
| 2009/0239693 | A1 | * | 9/2009 | Ruffini et al. | 474/112 |
| 2011/0070985 | A1 | * | 3/2011 | Deneszczuk et al. | 474/135 |
| 2012/0035011 | A1 | * | 2/2012 | Menachem et al. | 474/126 |
| 2012/0318589 | A1 | * | 12/2012 | Staley et al. | 180/65.21 |
| 2013/0071218 | A1 | * | 3/2013 | Hosek et al. | 414/744.5 |
| 2013/0178297 | A1 | * | 7/2013 | Pane et al. | 464/66.1 |
| 2014/0117686 | A1 | * | 5/2014 | Akae | 294/106 |
| 2014/0180482 | A1 | * | 6/2014 | Orita | 700/275 |
| 2015/0219189 | A1 | * | 8/2015 | Serkh et al. | 474/112 |

FOREIGN PATENT DOCUMENTS

JP 2006-231454 9/2006

* cited by examiner

*Primary Examiner* — William E Dondero
*Assistant Examiner* — Robert T Reese
(74) *Attorney, Agent, or Firm* — Rankin, Hill & Clark LLP

(57) ABSTRACT

A power transmission device has two roller members which are rotatable on their own axes and the outer peripheral portions of which are pressed against a wire member tightly stretched between two pulley members, a rotary gear which is rotatable around a revolution axial center of the roller members integrally with a supporting member which supports the roller members, a spring worm meshed with the rotary gear, and an actuator which controls the rotation amount of the spring worm.

6 Claims, 4 Drawing Sheets

POWER TRANSMISSION DEVICE

BACKGROUND OF THE INVENTION

1. Field of the Invention

The present invention relates to a power transmission device for driving a robot joint and the like.

2. Description of the Related Art

Hitherto, in a robot, such as an industrial robot, the amount of displacement of a joint has generally been controlled to a desired value by position control (servo control). A power transmission mechanism of a joint of this type of robot adopts, in many cases, a highly rigid structure that minimizes the chance of a change in the amount of displacement of the joint, which is caused by a change in an external force, so as to make it possible to accurately control the amount of displacement of the joint to the desired value.

However, the joint having the power transmission mechanism of the highly rigid structure exhibits poor flexibility under a variety of external environments that make it difficult to identify or predict the position or shape of an external object or a disturbance or the like beforehand. If, for example, a driven member of a joint comes in contact with an unexpected external object, then a situation frequently occurs, in which it becomes difficult to properly move the driven member or an excessive external force acts on an actuator that drives the joint.

In recent years, therefore, a study on a robot having a joint that permits elastic displacement has been carried out by the present applicant and others.

Meanwhile, as a power transmission mechanism of a joint of an industrial robot or the like, there has conventionally been known one having a construction proposed in, for example, Japanese Patent No. 4442464 (hereinafter referred to as Patent Document 1). According to the construction of the power transmission mechanism, a wire between two pulleys is provided with a spring so as to transmit power between the two pulleys through an elastic force generated by the spring, thereby enabling the joint to be elastically displaced.

For a robot required to carry out, for example, various tasks under various environments, the power transmission mechanism of a joint is desired to be configured to allow the stiffness characteristics (the degree of stiffness) of the joint to be variably controlled, thereby permitting a flexible motion of the robot suited for each type of task under each environmental condition.

It is further desired to configure the power transmission mechanism of the joint to allow the joint to generate a viscous force as necessary and to allow the viscosity characteristics, namely, the degree of ease of generating a viscous force, to be controlled.

However, the power transmission device having the construction described in the foregoing Patent Document 1 merely has the spring installed on the wire between the two pulleys. Hence, the power transmission device is not adapted to allow the stiffness characteristics between the two pulleys, i.e., the stiffness characteristics of the joint, to be variably controlled and also not adapted to allow the viscosity characteristics between the two pulleys to be variably controlled. There has been a risk that the power transmission device constructed as described in Patent Document 1 would inevitably have a complicated structure, an increased size or deteriorated drive efficiency if an attempt were to be made to enable the power transmission device to variably control the stiffness characteristics between the two pulleys, i.e., the stiffness characteristics of the joint, or to variably control the viscosity characteristics between the two pulleys, i.e., the viscosity characteristics of the joint.

SUMMARY OF THE INVENTION

The present invention has been made in view of such background, and it is an object of the invention to provide a power transmission device adapted to transmit power between two pulley members by a simple structure that minimizes the chance of deterioration of drive efficiency and allows the stiffness characteristics or the viscosity characteristics between the two pulley members to be variably controlled.

To this end, the power transmission device in accordance with the present invention is adapted to transmit power between a first pulley member and a second pulley member which has a rotational axial center parallel to a rotational axial center of the first pulley member and which is disposed laterally relative to the first pulley member, the power transmission device including:

a wire member which is wound around the outer peripheral portion of each of the first pulley member and the second pulley member and which is tightly stretched between the two pulley members;

a roller member, the outer peripheral portion of which is pressed against the wire member such that the wire member is curved between the two pulley members and which is provided rotatably around a rotational axial center thereof parallel to the rotational axial centers of the two pulley members as the wire member runs;

a supporting member which rotatably supports the roller member and which is provided rotatably around a revolution axial center eccentric from the rotational axial center of the roller member by a predetermined interval;

a rotary gear connected to the supporting member such that the rotary gear is rotatable around the revolution axial center integrally with the supporting member;

a spring worm engaged with the rotary gear; and a first actuator connected to the spring worm so as to allow the amount of rotation of the spring worm to be controlled (a first aspect of the invention).

A supplemental explanation will be given on the terms used in the present invention. The term "pulley member" means a pulley or a member having functions equivalent to those of a pulley. Similarly, the term "wire member" means a wire or a member having functions equivalent to those of a wire, and the term "roller member" means a roller or a member having functions equivalent to those of a roller. Further, the term "spring worm" means a member that functions as a spring and also as a worm gear. The definitions of the terms apply to the first aspect of the invention and also to the remaining aspects of the invention, which will be discussed hereinafter.

According to the first aspect of the invention, rotatively driving the spring worm by the first actuator causes the rotary gear meshed with the spring worm to rotate integrally with the supporting member around the revolution axial center. Thus, the roller member revolves around the revolution axial center.

Therefore, controlling the amount of rotation of the spring worm (the amount of rotation around the axial center) to an appropriate desired value by the first actuator makes it possible to control the phase angle of the revolution of the roller member around the revolution axial center (hereinafter referred to as "the roller revolution phase angle" in some cases) to a phase angle corresponding to the amount of rotation of the spring worm.

In a state wherein the amount of rotation of the spring worm, i.e., the amount of rotation around the axial center, is controlled to an appropriate desired value so as to maintain the amount of rotation constant (the state may be hereinafter referred to as "the reference state") as described above, a rotational driving force in a direction for pulling the wire member between the two pulley members is imparted to the first pulley member or the second pulley member. Thus, a rotational force that causes the roller member to revolve around the revolution axial center acts on the roller due to a translational force acting on the roller member, which is attributable to the tensile force imparted to the wire member, since the wire member is curved at the place where the wire member is pressed against the outer peripheral portion of the roller member.

At this time, the roller member revolves around the revolution axial center from the foregoing reference state while one of the two pulley members relatively rotates with respect to the other. Further, as the roller member revolves, the supporting member and the rotary gear rotate around the revolution axial center. This causes the spring worm meshed with the rotary gear to extend or contract.

Thus, an elastic force based on the amount or revolution, i.e., the rotation angle of revolution, of the roller member from the reference state is generated at the spring worm. Further, a rotational force, namely, a rotational force around the revolution axial center, attributable to the elastic force is imparted to the roller member from the spring worm through the intermediary of the rotary gear and the supporting member.

Then, finally, the amount of revolution of the roller member from the reference state and the amount of relative rotation between the two pulley members corresponding to the amount of revolution of the roller member reach equilibrium in a state wherein the rotational force acting on the roller member due to the elastic force generated at the spring worm and the rotational force acting on the roller member due to the tensile force are balanced out. In this state (hereinafter referred to as "the equilibrium state" in some cases), the rotational driving force is transmitted between the two pulley members.

Hence, imparting the rotational driving force to the first pulley member or the second pulley member consequently causes an elastic relative rotation between the two pulley members to happen, and an elastic force based on the amount of the relative rotation, i.e., an elastic rotational force attributable to the elastic force generated at the spring worm (hereinafter, referred to as "the elastic rotational force" in some cases), is generated between the two pulley members. The rotational driving force is transmitted between the two pulley members through the elastic rotational force.

In this case, if the rotational driving force imparted to the first pulley member or the second pulley member is constant, then the magnitude of a component of the translational force acting on the roller member due to the tensile force changes according to the roller revolution phase angle in the reference state. The component of the translational force is in a direction that is orthogonal to the radius of the revolution about the revolution axial center of the roller member.

Hence, if the rotational driving force imparted to the first pulley member or the second pulley member remains constant, then the rotational force acting on the roller member due to the tensile force changes according to the roller revolution phase angle in the reference state. Consequently, the amount of revolution of the roller member from the reference state to the equilibrium state and the amount of the relative rotation between the two pulley members corresponding thereto will change according to the roller revolution phase angle in the reference state.

Further, the amount of revolution of the roller member from the reference state to the equilibrium state and the amount of the relative rotation between the two pulley members increase as the rotational driving force imparted to the first pulley member or the second pulley member increases.

Thus, when attention is focused on the ratio between the change in the rotational driving force transmitted by the elastic rotational force between the two pulley members and the change in the amount of the relative rotation between the two pulley members (the ratio indicating the degree of the stiffness between the two pulley members), the ratio changes according to the rotational position of the roller member in the reference state.

According to the first aspect of the present invention, therefore, the stiffness characteristics between the two pulley members can be changed according to the rotational position of the roller member in the reference state.

Hence, the power transmission device according to the first aspect of the invention is capable of changing the stiffness characteristics between the two pulley members, namely, the first pulley member and the second pulley member, by the simple construction, which includes the wire member, the roller member, the rotary gear, and the spring worm and which minimizes the chance of deterioration of drive efficiency.

Preferably, the foregoing first aspect of the invention includes: a second actuator which selectively imparts a rotational driving force in a forward rotation direction or a rotational driving force in a reverse rotation direction to the first pulley member, wherein the wire member is tightly stretched on both sides of the two pulley members in a direction orthogonal to a direction of an interval between the two pulley members, a first roller member having an outer peripheral portion thereof pressed against the wire member at one side of both sides of the two pulley members and a second roller member having an outer peripheral portion thereof pressed against the wire member at the other side of both sides of the two pulley members are supported as the roller members by the supporting member, the first roller member and the second roller member are disposed such that the wire member on both sides of the two pulley members is held between the first roller member and the second roller member or the first roller member and the second roller member are held between wire member portions on both sides of the two pulley members, and the revolution axial center is disposed such that the revolution axial center intersects with a segment that connects the centers of rotation of the first roller member and the second roller member in the case where the first roller member and the second roller member are observed in the direction of the revolution axial center (a second aspect of the invention).

According to the second aspect of the invention, as the spring worm is rotated, both the first roller member and the second roller member integrally revolve around the revolution axial center. Therefore, in the reference state, the outer peripheral portions of the first roller member and the second roller member are pressed against the wire member on one side of both sides of the two pulley members and the wire member on the other side thereof, respectively. The pressed contact state remains unchanged even when the roller revolution phase angle (the phase angle of the revolution of each of the first roller member and the second roller member around the revolution axial center) in the reference state changes.

According to the second aspect of the invention, therefore, regardless of whether the rotational driving force in the forward rotation direction or the reverse rotation direction is imparted to the first pulley member from the second actuator, the operation described in the foregoing first aspect of the invention makes it possible to transmit the rotational driving force between the two pulley members through the elastic rotational force.

Further, in this case, regardless of whether the rotational driving force in the forward rotation direction or the reverse rotation direction is imparted to the first pulley member, the stiffness characteristics between the two pulley members can be changed by variably controlling the roller revolution phase angle in the reference state by the first actuator.

Further, in the first aspect or the second aspect of the invention described above, a viscous force can be generated between the first pulley member and the second pulley member by the following configuration.

In this case, the power transmission device further includes a cylinder structure having: a cylindrical section; a piston slidably provided in the cylindrical section in the axial direction of the cylindrical section; a pair of liquid chambers which are defined by the piston in the cylindrical section and which are in communication with each other through an orifice; and a viscous liquid sealed in the pair of liquid chambers, wherein the cylinder structure is disposed such that the axial direction of the cylindrical section is in the same direction in which the spring worm extends or contracts. One end and the other end of the spring worm are connected to the piston and the cylindrical section, respectively (a third aspect of the invention).

According to the third aspect of the invention, when the roller members (the first roller member and the second roller member in the second aspect of the invention) are revolved around the revolution axial center from the reference state, the piston of the cylinder structure slides as the spring worm extends or contracts. At this time, the viscous liquid is circulated between the pair of liquid chambers through the orifice thereby producing a sliding resistance of the piston, which leads to the generation of a viscous force providing the resistance of the revolution of the roller members.

Thus, the third aspect of the invention makes it possible to generate a viscous force, which is a viscous rotational force attributable to the viscosity generated in the cylinder structure (hereinafter referred to "the viscous rotational force" in some cases), between the two pulley members.

In the third aspect of the invention, the orifice is preferably configured such that the area of opening of the orifice is variably controllable (a fourth aspect of the invention).

The fourth aspect of the invention makes it possible to variably control the ratio of a change in the viscous rotational force relative to a change in the angular velocity of the revolution of the roller member, i.e., the ratio of a change in the viscous rotational force relative to a change in the angular velocity of the relative rotation between the two pulley members, which corresponds to a so-called viscosity coefficient. Thus, the viscosity characteristics between the two pulley members can be variably controlled.

Further, the power transmission device in accordance with the present invention may adopt the following configuration. The power transmission device in accordance with the present invention is a power transmission device adapted to transmit power between a first pulley member and a second pulley member which has a rotational axial center parallel to a rotational axial center of the first pulley member and which is disposed laterally relative to the first pulley member, the power transmission device including:

a wire member which is wound around the outer peripheral portion of each of the first pulley member and the second pulley member and which is stretched between the two pulley members;

a roller member, the outer peripheral portion of which is pressed against the wire member such that the wire member is curved between the two pulley members, and which is provided rotatably on a rotational axial center thereof parallel to the rotational axial centers of the two pulley members as the wire member runs;

a supporting member which rotatably supports the roller member and which is provided rotatably around a revolution axial center eccentric from the rotational axial center of the roller member by a predetermined interval;

a rotary gear connected to the supporting member such that the rotary gear is rotatable integrally with the supporting member around the revolution axial center;

a spring worm engaged with the rotary gear; and a cylinder structure having a cylindrical section, a piston slidably provided in the cylindrical section in the axial direction of the cylindrical section, a pair of liquid chambers which are defined by the piston in the cylindrical section and which are in communication with each other through an orifice, the area of the opening of which is variably controllable, and a viscous liquid sealed in the pair of liquid chambers, wherein the spring worm is provided such that the spring worm does not rotate around an axial center thereof, and one end and the other end of the spring worm are connected to the piston and the cylindrical section, respectively (a fifth aspect of the invention).

According to the fifth aspect of the invention, the spring worm is provided such that the spring worm does not rotate on the rotational axial center. This state of the spring worm corresponds to the reference state described in the first aspect of the invention.

Thus, as with the first embodiment, when the rotational driving force in the direction in which the wire member is pulled between the two pulley members is imparted to the first pulley member or the second pulley member, an elastic relative rotation between the two pulley members takes place, and an elastic rotational force based on the amount of the relative rotation, i.e., an elastic rotational force attributable to the elastic force generated at the spring worm, is generated between the two pulley members. The rotational driving force is transmitted between the two pulley members through the elastic rotational force.

Further, as with the fourth aspect of the invention, the fifth aspect of the invention has the cylinder structure and the opening area of the orifice of the cylinder structure is variably controllable. As with the fourth aspect of the invention, therefore, the fifth aspect of the invention also makes it possible to variably control the ratio of a change in the viscous rotational force relative to a change in the angular velocity of the revolution of the roller member, i.e., the ratio of a change in the viscous rotational force relative to a change in the angular velocity of the relative rotation between the two pulley members (the ratio corresponding to a so-called viscosity coefficient).

Thus, the power transmission device according to the fifth aspect of the invention is capable of properly changing the viscosity characteristics between the two pulley members, namely, the first pulley member and the second pulley member, while permitting the elastic relative rotation between the two pulley members by the simple construction, which includes the wire member, the roller member, the rotary gear, the spring worm, and the cylinder structure and which minimizes the chance of deterioration of drive efficiency.

Preferably, the fifth aspect of the invention includes an actuator which selectively imparts a rotational driving force in a forward rotation direction or a rotational driving force in a reverse rotation direction to the first pulley member, wherein the wire member is tightly stretched on both sides of the two pulley members in a direction orthogonal to a direction of an interval between the two pulley members, a first roller member having an outer peripheral portion thereof pressed against the wire member at one side of both sides of the two pulley members and a second roller member having an outer peripheral portion thereof pressed against the wire member at the other side of both sides of the two pulley members are supported as the roller members by the supporting member, the first roller member and the second roller member are disposed such that the wire member on both sides of the two pulley members is held between the first roller member and the second roller member or the first roller member and the second roller member are held between wire member portions on both sides of the two pulley members, and the revolution axial center is disposed such that the revolution axial center intersects with a segment that connects the centers of rotation of the first roller member and the second roller member in the case where the first roller member and the second roller member are observed in the direction of the revolution axial center (a sixth aspect of the invention).

According to the sixth aspect of the invention, regardless of whether the rotational driving force in the forward rotation direction or the reverse rotation direction is imparted to the first pulley member from the actuator, which corresponds to the second actuator in the second aspect of the invention, the rotational driving force can be transmitted between the two pulley members through the elastic rotational force, as with the second aspect of the invention.

In this case, regardless of whether the rotational driving force in the forward rotation direction or the reverse rotation direction is imparted to the first pulley member, the viscosity characteristics between the two pulley members can be changed by variably controlling the opening area of the orifice of the cylinder structure.

DESCRIPTION OF THE PREFERRED EMBODIMENTS

An embodiment of the present invention will be described below with reference to FIG. 1 to FIG. 4.

Figure 1:
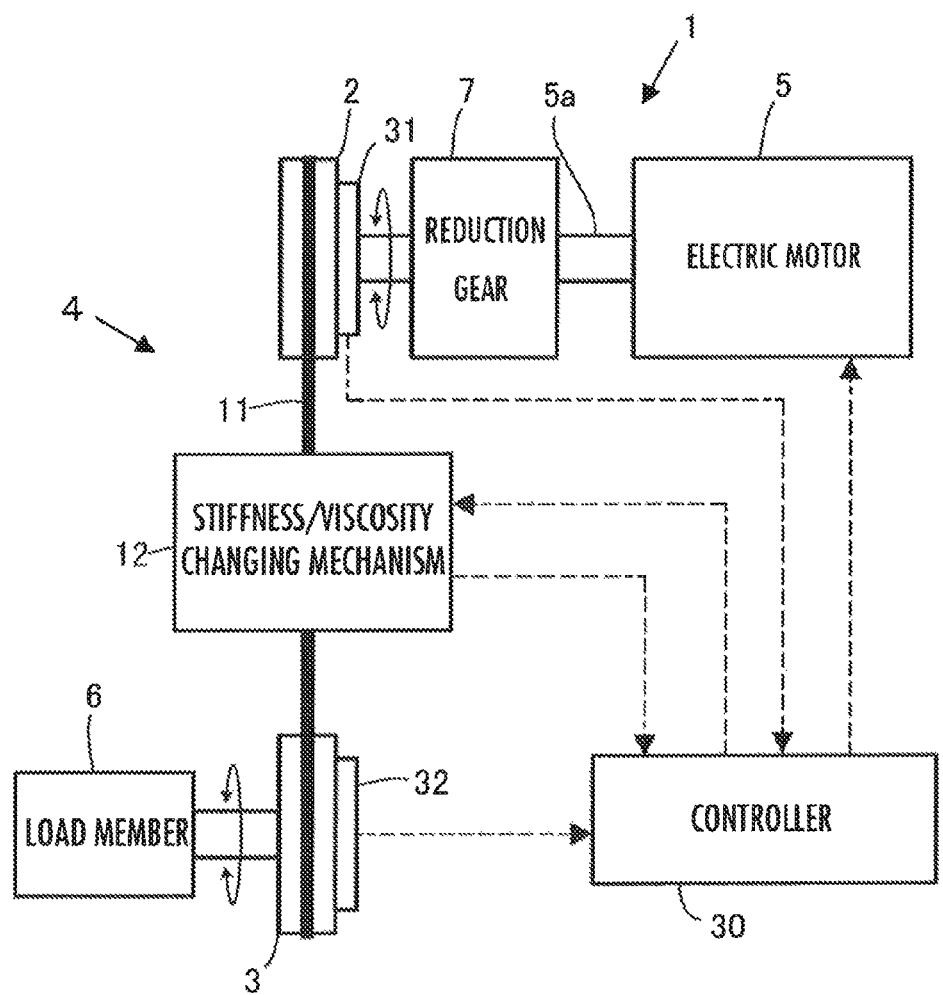
FIG. 1 is a diagram illustrating the entire system configuration of a power transmission device according to an embodiment of the present invention.

As illustrated in FIG. 1, a power transmission device 1 according to the present embodiment has a first pulley 2 serving as a first pulley member, a second pulley 3 serving as a second pulley member, and an elastic force generating mechanism 4 that generates an elastic force between the pulleys 2 and 3. The elastic force generating mechanism 4 is capable of generating not only an elastic force but also a viscous force between the two pulleys 2 and 3.

In the present embodiment, of the first pulley 2 and the second pulley 3, the first pulley 2 is used as a drive pulley and the second pulley 3 is used as a driven pulley. Hence, the power transmission device 1 has an electric motor 5 serving as an actuator that imparts a rotational driving force to the first pulley 2 (hereinafter referred to as "the drive pulley 2"), and a load member 6 fixed to the second pulley 3 (hereinafter referred to as "the driven pulley 3") such that the load member 6 rotates integrally with the driven pulley 3. The electric motor 5 corresponds to the second actuator in the present invention.

Although the load member 6 is illustrated as an integral structure in FIG. 1, the load member 6 does not have to be an integral structure. For example, the load member 6 may alternatively be a link mechanism that includes one or more joints.

In the case where the power transmission device 1 according to the present embodiment is used as the power transmission device for a robot joint, the power transmission device 1 is installed to the joint such that, for example, one of two links connected through the intermediary of the joint (two links that relatively rotate at the joint) becomes the load member 6 and the two pulleys 2 and 3 are rotatably supported by the other link.

The drive pulley 2 is connected to a rotating drive shaft 5a of the electric motor 5 through a reduction gear 7. Further, as the rotating drive shaft 5a of the electric motor 5 rotates, the drive pulley 2 rotates by a rotational driving force (torque) imparted through the reduction gear 7 from the rotating drive shaft 5a of the electric motor 5.

The reduction gear 7 may have an arbitrary structure. The reduction gear 7 may be, for example, Harmonic Drive (registered trademark) or a reduction gear constituted of a plurality of gears. Alternatively, the reduction gear 7 may be provided with a mechanism for converting a linear motion into a rotational motion. In this case, for example, a linear motion actuator constructed of an electric motor and a ball screw or an electric linear motor may be used as an actuator.

The electric motor 5 and the drive pulley 2 are coaxially disposed in FIG. 1. Alternatively, however, the rotational axes of the electric motor 5 and the drive pulley 2 do not have to be coaxial.

The driven pulley 3 is arranged side by side in a line with the drive pulley 2 such that the rotational axial center of the driven pulley 3 is parallel to the rotational axial center of the drive pulley 2.

The elastic force generating mechanism 4 has a wire 11, which is mounted on and run between the drive pulley 2 and the driven pulley 3, and a stiffness/viscosity changing mechanism 12 for changing the stiffness and the viscosity between the two pulleys 2 and 3.

Figure 2:
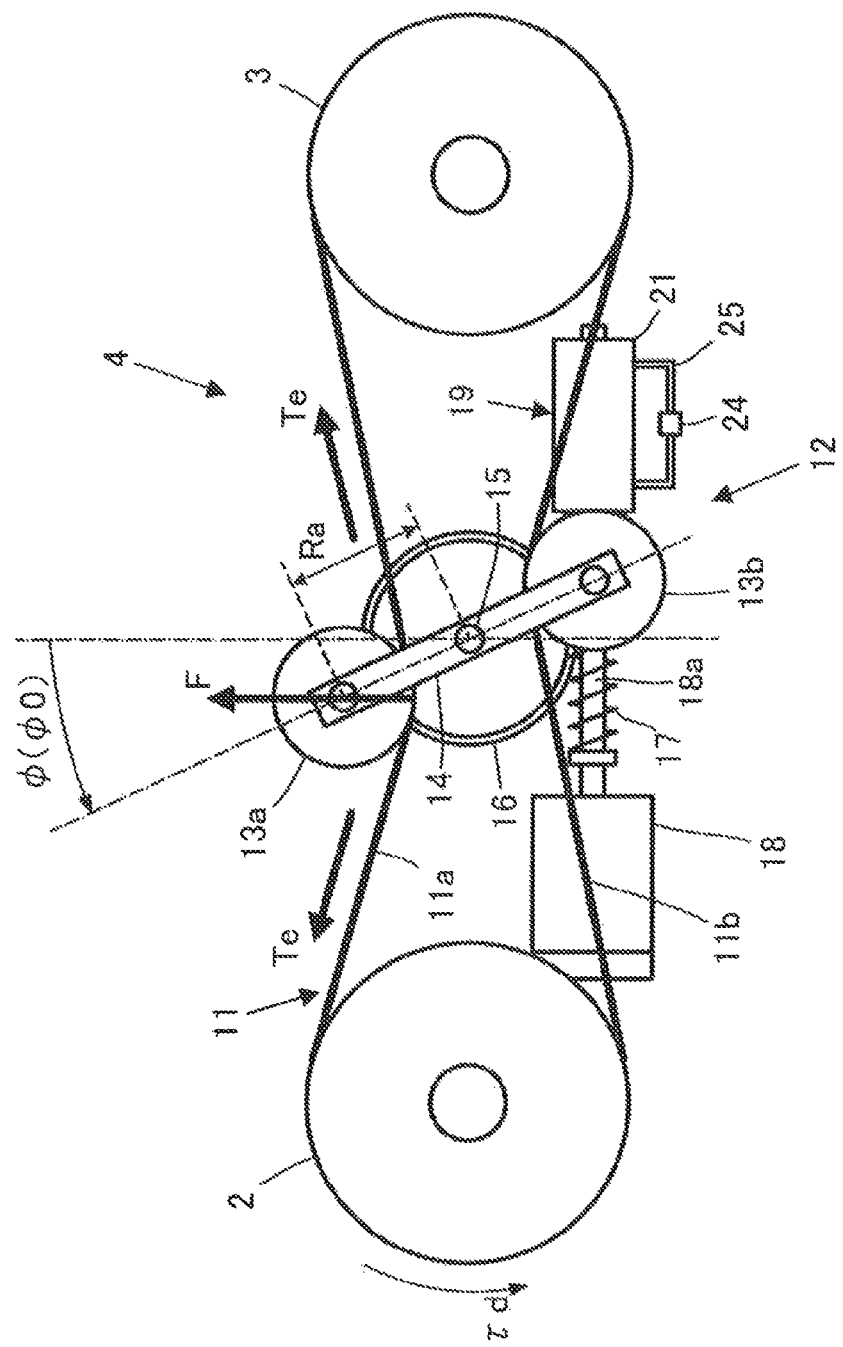
FIG. 2 is a diagram illustrating the configuration of an elastic force generating mechanism of the power transmission device illustrated in FIG. 1.

The wire 11 is wound around the outer peripheral portion of each of the drive pulley 2 and the driven pulley 3 and tightly stretched between the two pulleys 2 and 3. More specifically, the wire 11 has two stretched portions 11a and 11b extending between the two pulleys 2 and 3 as illustrated in FIG. 2. The wire 11 is installed such that a portion thereof except the stretched portions 11a and 11b is sliplessly wound on places of the outer peripheries of the two pulleys 2 and 3 excluding the inner end portions of the outer peripheries (more specifically, the portion of the outer periphery of the drive pulley 2 that faces the driven pulley 3, and a portion of the outer periphery of the driven pulley 3 that faces the drive pulley 2).

The stretched portions 11a and 11b are respectively provided at both sides of the two pulleys 2 and 3 in a direction that is orthogonal to the direction of the interval between the two pulleys 2 and 3, i.e., in the vertical direction in FIG. 2. The wire 11 is slightly stretchable.

Supplementarily, the wire 11 does not have to be an endless type. Alternatively, for example, the two ends of each of the stretched portions 11a and 11b may be fixed to the drive pulley 2 and the driven pulley 3, respectively.

Figure 3:
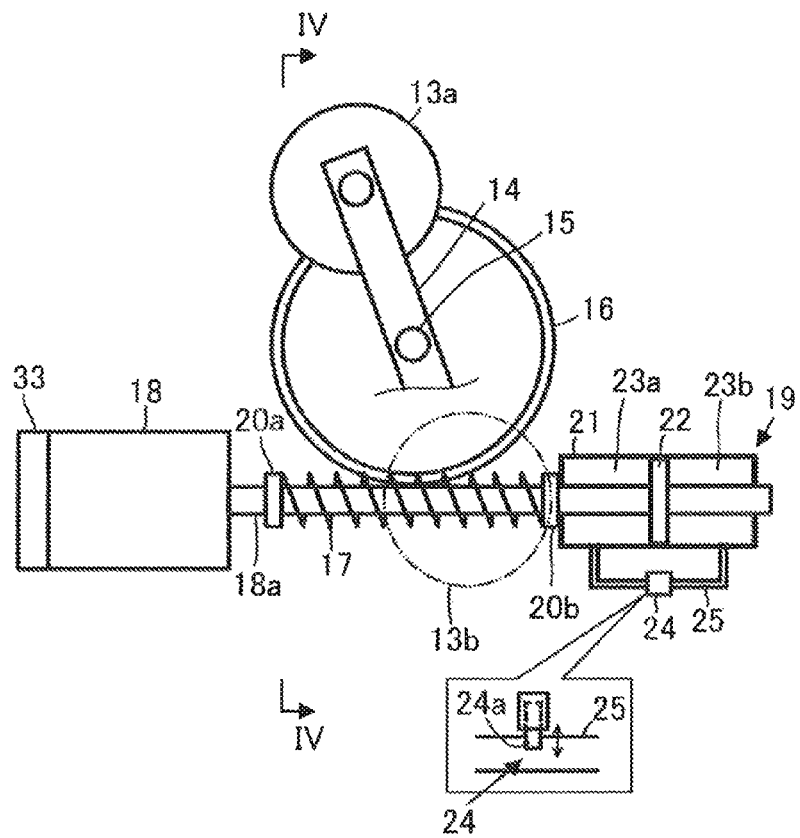
FIG. 3 is a diagram illustrating the configuration of an essential section of the elastic force generating mechanism illustrated in FIG. 2.
Figure 4:
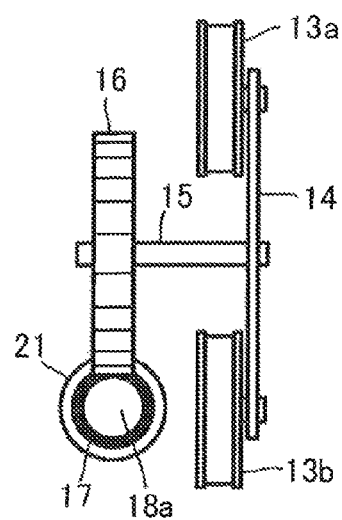
FIG. 4 is a sectional view taken along line IV-IV in FIG. 3.

The stiffness/viscosity changing mechanism 12 is configured, for example, as illustrated in FIG. 2 to FIG. 4. More specifically, the stiffness/viscosity changing mechanism 12 has a rotating bar 14, to both ends of which the rollers 13a and 13b serving as the two roller members, namely, the first and the second roller members, are rotatably attached. The rotating bar 14 corresponds to the supporting member in the present invention. The rotating bar 14 is rotatable integrally with a rotating shaft 15 around the axial center of the rotating shaft 15 fixed at the center of the rotating bar 14. The rotating shaft 15 is disposed between the drive pulley 2 and the driven pulley 3 in a posture parallel to the rotational axial centers of the two pulleys 2 and 3.

Further, the rotational axial center of each of the rollers 13a and 13b at the two ends of the rotating bar 14 is oriented in a direction parallel to the rotational axial centers of the drive pulley 2 and the driven pulley 3, i.e., in a direction parallel to the axial center of the rotating shaft 15.

Hence, the rollers 13a and 13b are able to revolve around the axial center of the rotating shaft 15, which is eccentric from the rotation axial centers of the rollers 13a and 13b. Further, the axial center of the rotating shaft 15 (hereinafter referred to as "the revolution axial center" in some cases) in the present embodiment is disposed such that the revolution axial center intersects with a segment, which connects the centers of the rotation of the rollers 13a and 13b on their axes, at the midpoint of the segment when the rollers 13a and 13b are observed in the direction of the revolution axial center, i.e., in the direction perpendicular to the paper surface of the FIG. 2.

Further, the outer peripheral portion on the inner end side of the roller 13a, which is one of the rollers 13a and 13b (the side thereof facing the other roller 13b), is pressed against the stretched portion 11a, which is one of the two stretched portions 11a and 11b of the wire 11. Further, the outer peripheral portion on the inner end side of the other roller 13b, i.e., the side thereof facing the one roller 13a, is pressed against the other stretched portion 11b of the wire 11.

Thus, the rollers 13a and 13b are pressed against the stretched portions 11a and 11b, respectively, such that the rollers 13a and 13b sandwich the stretched portions 11a and 11b of the wire 11. In this case, the stretched portions 11a and 11b of the wire 11 are curved at the places where the stretched portions 11a and 11b are pressed against the rollers 13a and 13b, respectively. As the stretched portions 11a and 11b of the wire 11 run, the rollers 13a and 13b respectively rotates on their own axes.

The stiffness/viscosity changing mechanism 12 further includes a rotary gear (spur gear) 16, which is connected to the rotating bar 14 through the rotating shaft 15 and which is rotatable integrally with the rotating bar 14, a spring worm 17 meshed with the rotary gear 16, an electric motor 18 which rotatively drive the spring worm 17, and a cylinder structure 19. The electric motor 18 corresponds to the first actuator in the present invention.

The spring worm 17 is a spring member formed into a coil spring capable of functioning as a worm gear and is externally inserted onto a rotating drive shaft 18a of the electric motor 18. One end of the spring worm 17, which end is adjacent to the main body of the electric motor 18, is fixed to a spring washer member 20a fixed to the rotating drive shaft 18a.

Accordingly, the spring worm 17 rotates integrally with the rotating drive shaft 18a of the electric motor 18. The rotary gear 16 rotates as the spring worm 17 rotates.

The cylinder structure 19 has a cylindrical section 21 disposed coaxially with the rotating drive shaft 18a at the other end side of the spring worm 17. The rotating drive shaft 18a of the electric motor 18 penetrates the inside of the cylindrical section 21. The cylindrical section 21 is slidable in the direction of the axial center thereof along the rotating drive shaft 18a. Further, the other end of the spring worm 17 is fixed to the spring washer member 20b, which is fixed to the end surface of the cylindrical section 21 that is adjacent to the spring worm 17. Thus, as the spring worm 17 extends or contracts, the cylindrical section 21 of the cylinder structure 19 slides in the direction of the axial center of the rotating drive shaft 18a of the electric motor 18.

Further, a piston 22 fixed to the rotating drive shaft 18a is provided in the cylindrical section 21, and the outer peripheral surface of the piston 22 is in sliding contact with the inner peripheral surface of the cylindrical section 21. Hence, one end of the spring worm 17 that is adjacent to the main body of the electric motor 18 is connected to the piston 22 through the rotating drive shaft 18a serving as a piston shaft. Further, the other end of the spring worm 17 is connected to the cylindrical section 21.

Further, a viscous oil serving as a viscous liquid is sealed in oil chambers 23a and 23b, which are two liquid chambers defined by the piston 22 in the cylindrical section 21. The oil chambers 23a and 23b are in communication with each other through a communication pipe 25 having an orifice 24. In this case, the area of the opening of the orifice 24 is variably controllable. For example, as illustrated by the enlarged view in FIG. 3, the area of the opening of the orifice 24 can be changed by changing the amount of protrusion of an electric pin-shaped valve element 24a into the communication pipe 25. The communication pipe 25 or a passage corresponding thereto may be formed on a side wall portion or the like of the cylindrical section 21.

The power transmission device 1 according to the present embodiment is further provided with a controller 30 constituted of an electronic circuit unit that includes a CPU, a RAM, a ROM and the like to control the operation of the power transmission device 1, angle detectors 31 and 32 which detect the rotation angle of the drive pulley 2 and the rotation angle of the driven pulley 3, respectively, and an angle detector 33 (illustrated in FIG. 2) which detects the rotation angle of the rotating drive shaft 18a of the electric motor 18 of the stiffness/viscosity changing mechanism 12 (=the rotation angle of the spring worm 17).

In this case, the controller 30 has a function for controlling the electric motor 5, which imparts a rotational driving force to the drive pulley 2 (hereinafter referred to as "the power source motor 5"), and the electric motor 18, which rotatively drives the spring worm 17 (hereinafter referred to as "the stiffness changing motor 18"), on the basis of mainly the detection signals of the angle detectors 31 to 33 by carrying out programmed processing. The controller 30 also has a function for controlling the area of the opening of the orifice 24 by controlling the operation of the valve element 24a of the orifice 24.

A description will now be given of the operation of the power transmission device 1 constructed as described above.

Rotatively driving the spring worm 17 by the stiffness changing motor 18 causes the rotating bar 14 to be rotated through the intermediary of the rotary gear 16 meshed with the spring worm 17. Consequently, the rollers 13a and 13b supported by the rotating bar 14 revolve around the axial center of the rotating shaft 15 serving as the revolution axial center of the rollers 13a and 13b.

Thus, the phase angle of the revolution of the rollers 13a and 13b around the revolution axial center can be controlled by controlling the stiffness changing motor 18. In the following description, the phase angle will be defined as a revolution angle φ of the rollers 13a and 13b from a state in which the extending direction of the rotating bar 14, i.e., the direction of the interval between the rollers 13a and 13b, is orthogonal to the direction of the interval between the drive pulley 2 and the driven pulley 3 (the angle of rotation around the revolution axial center), as illustrated in FIG. 2. The phase angle φ will be referred to as the revolution phase angle φ.

It is assumed that the revolution phase angle φ in a state wherein no power is being transmitted between the two pulleys 2 and 3 (no rotational driving force is being transmitted) is controlled to a predetermined angle value, e.g. φ in FIG. 2, and in this state, the rotation of the rotating drive shaft 18a of the stiffness changing motor 18, i.e., the rotation of the spring worm 17, is stopped. This state will be hereinafter referred to as "the reference state."

In the reference state, if the rotational driving force (torque) is imparted to the drive pulley 2 from the power source motor 5, then a tensile force that is proportional to the rotational driving force is generated at one of the stretched portions 11a and 11b of the wire. Then, the rotational driving force is transmitted to the driven pulley 3 from the drive pulley 2 through the tensile force.

In this case, the portions of the wire 11, against which the rollers 13a and 13b are pressed, are curved. Hence, a translational force in the direction, which is substantially orthogonal to the direction of the interval between the two pulleys 2 and 3, acts on either the roller 13a or 13b of the rollers 13a and 13b that is in contact with the stretched portion 11a or 11b due to the tensile force generated at one of the stretched portions 11a and 11b of the wire 11, as described above.

For example, as illustrated in FIG. 2, if a torque τd in the counterclockwise direction (hereinafter the direction will be defined as the forward rotation direction for convenience sake) is imparted to the drive pulley 2 from the power source motor 5, then a tensile force Te that is proportional to the torque τd (=τd/effective radius of rotation of the drive pulley 2) is generated at the stretched portion 11a of the wire 11. The tensile force Te causes a translational force F to act on the roller 13a. The magnitude of the translational force F is substantially proportional to the torque τd. Further, the tensile force Te in FIG. 2 denotes a tensile force acting on the roller 13a.

Although not illustrated, in the case where a torque in the reverse rotation direction, i.e., the clockwise direction, is imparted to the drive pulley 2 from the power source motor 5, a tensile force that is proportional to the torque is generated at the stretched portion 11b of the wire 11. Due to the tensile force, the translational force in the direction substantially orthogonal to the direction of the interval between the two pulleys 2 and 3 (a translational force that is substantially in the opposite direction from the direction of the translational force F illustrated in FIG. 2) acts on the roller 13b.

In the case where the revolution phase angle φ of the rollers 13a and 13b in a reference state is not zero (e.g. the state illustrated in FIG. 2), a rotational driving force (torque) will act on all the rollers 13a and 13b and the rotating bar 14 due to the foregoing translational force (hereinafter denoted by "F") acting on the roller 13a or 13b. Thus, the rollers 13a and 13b revolve around the revolution axial center while the drive pulley 2 relatively rotates with respect to the driven pulley 3. Consequently, the rotary gear 16, which is meshed with the spring worm 17, rotates integrally with the rotating bar 14 around the revolution axial center.

In this case, the torque (hereinafter denoted by "τa") that acts on all the rollers 13a and 13b and the rotating bar 14 due to the translational force F acting on the roller 13a or 13b has a relationship denoted by expression (1) given below relative to the translational force F. As illustrated in FIG. 2, φ0 denotes the value of the revolution phase angle φ of the rollers 13a and 13b in the reference state, and Ra denotes the radii of rotation of the axial portions of the rollers 13a and 13b around the revolution axial center, i.e., the axial center of the rotating shaft 15.

$$\tau a = F \cdot \sin(\phi 0) \cdot Ra \quad (1)$$

In the situation in which the torque τa is acting on all the rollers 13a and 13b and the rotating bar 14, the spring worm 17 does not rotate. Hence, the rotation of the rotary gear 16 causes a part of the spring worm 17 (more specifically, the portion between the meshed portion of the rotary gear 16 and the spring washer member 20a adjacent to the stiffness changing motor 18) to extend or contract. Then, the spring worm 17 generates an elastic force corresponding to the amount of the extension or the contraction.

In this case, the amount of extension or contraction of the spring worm 17 from the reference state, i.e., the amount of revolution of the rollers 13a and 13b and the rotating bar 14 from the reference state (the amount of change in the revolution phase angle φ), will be finally balanced in a state wherein the torque acting on the rotary gear 16 due to the elastic force (translational force) of the spring worm 17 and the torque acting on the rotating bar 14 (=the torque acting on the rotary gear 16) attributable to the translational force F acting on the roller 13a or 13b due to the tensile force of the wire 11 are balanced out. In the balanced state, the torque τd imparted to the drive pulley 2 from the power source motor 5 is transmitted to the driven pulley 3 through the elastic force generating mechanism 4.

The rotation amount of the revolution of the rollers 13a and 13b from the reference state in the balanced state is denoted by Δφ [rad], the radius of rotation of the rotary gear 16 is denoted by Rb, and the stiffness of the spring worm 17 (the amount of change in the elastic force generated per unit change amount of the amount of extension or contraction of the spring worm 17, i.e., "spring constant") is denoted by Ksp_w. At this time, the torque acting on the rotary gear 16 due to the elastic force of the spring worm 17 in the balanced state (the torque will be hereinafter denoted by τb) will be determined by expression (2) given below.

$$\tau b = Ksp\_w \cdot \sin(\Delta \phi) \cdot Rb \approx Ksp\_w \cdot \Delta \phi \cdot Rb \quad (2)$$

From this expression (2) and the foregoing expression (1), the relationship between the translational force F in the balanced state and the rotation amount of revolution Δφ of the rollers 13a and 13b and the rotating bar 14 from the reference state is given by expression (3) below.

$$F = (Ksp\_w \cdot Rb / \sin(\phi 0) \cdot Ra) \cdot \Delta \phi \quad (3)$$

Thus, the translational force F acting on the roller 13a or 13b due to the tensile force of the wire 11 is proportional to the rotation amount of revolution Δφ of the rollers 13a and 13b and the rotating bar 14 from the reference state.

The translational force F acting on the roller 13a or 13b due to the tensile force of the wire 11 increases as the torque imparted to the drive pulley 2, i.e., the torque transmitted to the driven pulley 3, increases. The relative rotation amount (the amount of relative rotation from the reference state) of the drive pulley 2 in relation to the driven pulley 3 increases as the rotation amount of revolution $\Delta\phi$ of the rollers 13*a* and 13*b* and the rotating bar 14 from the reference state in the balanced state increases.

Therefore, if the torque transmitted from the drive pulley 2 to the driven pulley 3, i.e., the torque imparted to the driven pulley 3, in a steady state wherein the amount of relative rotation between the two pulleys 2 and 3 is maintained constant is denoted by τsp and the amount of relative rotation between the two pulleys 2 and 3 is denoted by $\Delta\theta$, then the proportional relationship approximately denoted by expression (4) given below is established between τsp and $\Delta\theta$.

$$\tau sp = Ksp \cdot \Delta\theta \quad (4)$$

Hence, the elastic force generating mechanism 4 functions as a spring member that transmits power (transmits a rotational driving force) between the drive pulley 2 and the driven pulley 3. The foregoing torque τsp corresponds to the torque transmitted by the elastic force generated between the two pulleys 2 and 3 by the elastic force generating mechanism 4 (hereinafter referred to as "the elastic force torque τsp"). In this case, Ksp in expression (4) denotes the ratio of a change in the elastic force torque τsp relative to a change in the amount of relative rotation $\Delta\theta$ between the two pulleys 2 and 3 (hereinafter referred to as "the inter-pulley rotation angle difference $\Delta\theta$). The ratio will be hereinafter referred to as "the stiffness characteristic coefficient Ksp."

The stiffness characteristic coefficient Ksp denotes the stiffness between the two pulleys 2 and 3. A larger value of Ksp means higher stiffness between the two pulleys 2 and 3 (less chance of the occurrence of a difference in rotation amount between the two pulleys 2 and 3). The value of the stiffness characteristic coefficient Ksp of the elastic force generating mechanism 4 in the present embodiment basically depends on the revolution phase angle $\phi\Delta$ of the rollers 13*a* and 13*b* in the reference state. In this case, as $\phi 0$ increases, the value of Ksp decreases.

Accordingly, the stiffness characteristics between the two pulleys 2 and 3 (more specifically, the stiffness characteristic coefficient Ksp) can be variably controlled by controlling the revolution phase angle $\phi 0$ of the rollers 13*a* and 13*b* in the reference state by the stiffness changing motor 18.

Supplementarily, if the revolution phase angle $\phi 0$ of the rollers 13*a* and 13*b* in the reference state is zero, then the translational force F acting on the roller 13*a* or 13*b* due to the tensile force of the wire 11 will not become a force that causes the rollers 13*a* and 13*b* and the rotating bar 14 to rotate. Consequently, the revolution phase angle $\phi 0$ of the rollers 13*a* and 13*b* will be maintained at zero. This state, therefore, is the state in which the stiffness between the two pulleys 2 and 3 is the highest.

Further, in the elastic force generating mechanism 4 according to the present embodiment, when the rollers 13*a* and 13*b* and the rotating bar 14 revolve around the revolution axial center from the reference state, the cylindrical section 21 of the cylinder structure 19 relatively slides with respect to the piston 22 as the spring worm 17 extends or contracts.

At this time, the circulation of the viscous oil between the oil chambers 23*a* and 23*b* through the communication pipe 25, which has the orifice 24, generates a viscous force, which provides the force of resistance to the sliding of the cylindrical section 21. Thus, the viscous force, which provides the force of resistance to the revolution of the rollers 13*a* and 13*b* and the rotating bar 14 from the reference state and consequently the relative rotation of the drive pulley 2 with respect to the driven pulley 3, is generated between the two pulleys 2 and 3. The viscous force is changed by changing the area of the opening of the orifice 24.

In this case, if the area of the opening of the orifice 24 is maintained constant, then the viscous force generated in the cylinder structure 19 will be proportional to the moving speed of the cylindrical section 21 relative to the piston 22, i.e., the extending/contracting speed of the spring worm 17. Further, the extending/contracting speed of the spring worm 17 is substantially proportional to the rotational speed of the revolution of the rollers 13*a* and 13*b* and the rotating bar 14.

The temporal change rate of the amount of relative rotation between the two pulleys 2 and 3, i.e., the speed of relative rotation between the two pulleys 2 and 3 (the difference between the rotation angles of the two pulleys 2 and 3), will be based on the rotational speed of the revolution of the rollers 13*a* and 13*b* and the rotating bar 14. This means that the speed of relative rotation between the two pulleys 2 and 3 increases as the rotational speed of the revolution increases.

Accordingly, if the speed of relative rotation between the two pulleys 2 and 3 is denoted by $\Delta\omega$ [rad/s] and the torque imparted between the drive pulley 2 and the driven pulley 3 by the viscous force between the two pulleys 2 and 3 (hereinafter referred to as "the viscous force torque") is denoted by τdp, then a relationship approximately denoted by expression (5) given below is established between $\Delta\omega$ and τdp.

$$\tau dp = Kdp \cdot \Delta\omega \quad (5)$$

Thus, the elastic force generating mechanism 4 also has the function for generating the viscous force between the drive pulley 2 and the driven pulley 3. In this case, Kdp in expression (5) denotes the ratio of a change in the viscous force torque τdp relative to a change in the speed of relative rotation $\Delta\omega$ between the two pulleys 2 and 3 (hereinafter referred to as "the inter-pulley rotational speed difference $\Delta\omega$"). Hereinafter, Kdp will be referred to as "the viscosity characteristic coefficient Kdp."

The viscosity characteristic coefficient Kdp denotes the degree of viscosity between the two pulleys 2 and 3. A greater value of Kdp means higher viscosity between the two pulleys 2 and 3, i.e., higher tendency of an increase in the viscous force generated between the two pulleys 2 and 3. The value of the viscosity characteristic coefficient Kdp of the elastic force generating mechanism 4 in the present embodiment basically depends on the area of the opening of the orifice 24. In other words, the value of Kdp decreases as the area of the opening increases.

Accordingly, the viscosity characteristics between the two pulleys 2 and 3, namely, the viscosity characteristic coefficient Kdp, can be variably controlled by controlling the area of the opening of the orifice 24 through the valve element 24*a*.

The above has described the basic operation of the power transmission device 1 according to the present embodiment.

The operation of the power transmission device 1 is controlled, for example, as described below. The controller 30 controls the stiffness changing motor 18 such that the stiffness characteristic coefficient Ksp reaches a desired value which is variably determined as necessary.

More specifically, the controller 30 determines the desired value of the rotation angle of the rotating drive shaft 18*a* of the stiffness changing motor 18 for setting the revolution phase angle $\phi 0$ of the rollers 13*a* and 13*b* in the reference state to an angle value corresponding to the desired value of the stiffness characteristic coefficient Ksp on the basis of the desired value of the stiffness characteristic coefficient Ksp according to a predetermined map or arithmetic expression. Further, the controller 30 controls an actual rotation angle (an observed value indicated by an output of the angle detector 33) of the rotating drive shaft 18*a* of the stiffness changing motor 18 to a desired value of the rotation angle by servo control.

Further, the controller 30 controls the area of the opening of the orifice 24 such that the viscosity characteristic coefficient Kdp reaches a desired value that is variably determined as necessary.

More specifically, the controller 30 determines the desired value of the area of the opening of the orifice 24 that corresponds to the desired value of the viscosity characteristic coefficient Kdp on the basis of the desired value of the viscosity characteristic coefficient Kdp according to a predetermined map or arithmetic expression. Then, the controller 30 controls the actual area of the opening of the orifice 24 to the determined desired value through the electric valve element 24a.

Further, the controller 30 controls the power source motor 5 so as to impart a required rotational driving force (torque) from the power source motor 5 to the drive pulley 2. At this time, the rotational driving force is transmitted to the load member 6 from the drive pulley 2 through the intermediary of the elastic force generating mechanism 4 and the driven pulley 3. This actuates the load member 6. In this case, an elastic force is generated between the two pulleys 2 and 3 according to the stiffness characteristics defined by the desired value of the stiffness characteristic coefficient Ksp. In addition, a viscous force is generated between the two pulleys 2 and 3 according to the viscosity characteristics defined by the desired value of the viscosity characteristic coefficient Kdp.

The power transmission device 1 according to the present embodiment described above is capable of generating an elastic force and a viscous force between the two pulleys 2 and 3 by the elastic force generating mechanism 4 having a simple structure as illustrated in FIG. 2 to FIG. 4, which minimizes the chance of deterioration of drive efficiency regardless of whether the drive pulley 2 is rotatively driven in the forward rotation direction or the reverse rotation direction.

Further, the stiffness characteristic coefficient Ksp that defines the stiffness characteristics between the pulleys 2 and 3 can be variably controlled simply by controlling the rotation amount of the spring worm 17 by the stiffness changing motor 18, i.e., by controlling the revolution phase angle φ0 of the rollers 13a and 13b in the reference state.

Further, the viscosity characteristic coefficient Kdp, which defines the viscosity characteristics between the two pulleys 2 and 3, can be variably controlled by controlling the area of the opening of the orifice 24 of the cylinder structure 19.

The following will describe several modifications related to the embodiment described above.

The power transmission device 1 in the embodiment has been adapted to allow the viscosity between the two pulleys 2 and 3, namely, the viscosity characteristic coefficient Kdp, to be variably controlled. Alternatively, however, the setup for variably controlling the viscosity may be omitted.

For example, the cylinder structure 19 may be omitted so as to generate substantially no viscous force between the two pulleys 2 and 3 (including a case where the viscous force is sufficiently minute). Further alternatively, the opening area of the orifice 24 of the cylinder structure 19 may be kept constant so as to maintain the viscosity characteristic coefficient Kdp between the two pulleys 2 and 3 at a constant level.

Further, the power transmission device 1 according to the embodiment has been configured to allow the stiffness between the two pulleys 2 and 3, namely, the stiffness characteristic coefficient Ksp, to be variably controlled. Alternatively, however, the setup for variably controlling the stiffness may be omitted.

For example, one end or both ends of the spring worm 17 may be fixed so as to prevent the spring worm 17 from rotating. Further alternatively, the spring worm 17 may be held in a rotation halt state by the electric motor 18 in FIG. 2. This makes it possible to construct an embodiment of the fifth or the sixth aspect of the invention.

Figure 5:
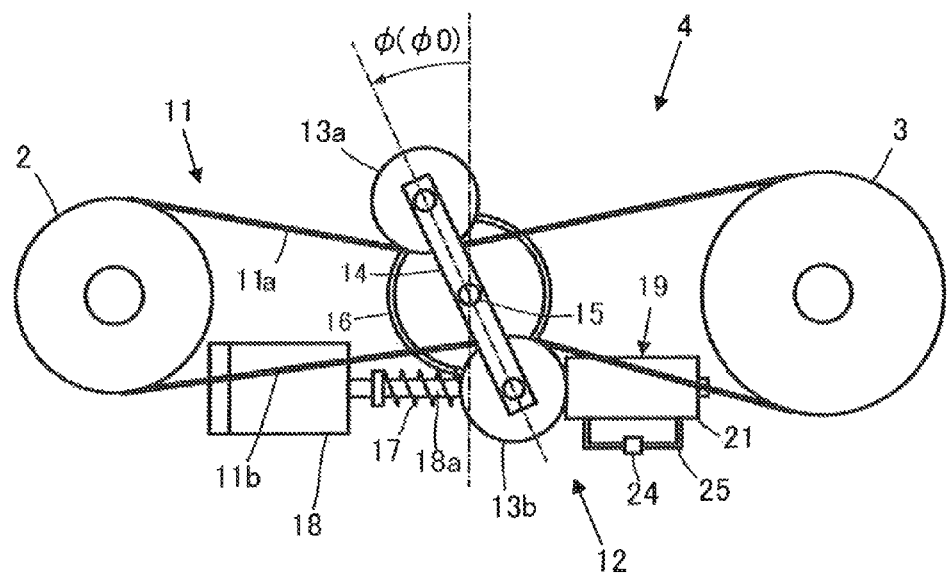
FIG. 5 is a diagram illustrating the configuration of an elastic force generating mechanism of a power transmission device according to a modification.

Further, in the power transmission device 1 according to the embodiment, the drive pulley 2 (the first pulley member) and the driven pulley 3 (the second pulley member) have been adapted to have the same rotation radius as illustrated in FIG. 2. Alternatively, however, the drive pulley 2 and the driven pulley 3 may have rotation radii that are different from each other as illustrated in FIG. 5. In this case, the elastic force generating mechanism 4 between the two pulleys 2 and 3 may be provided with a function as a reduction gear or a speed-up gear.

Figure 6:
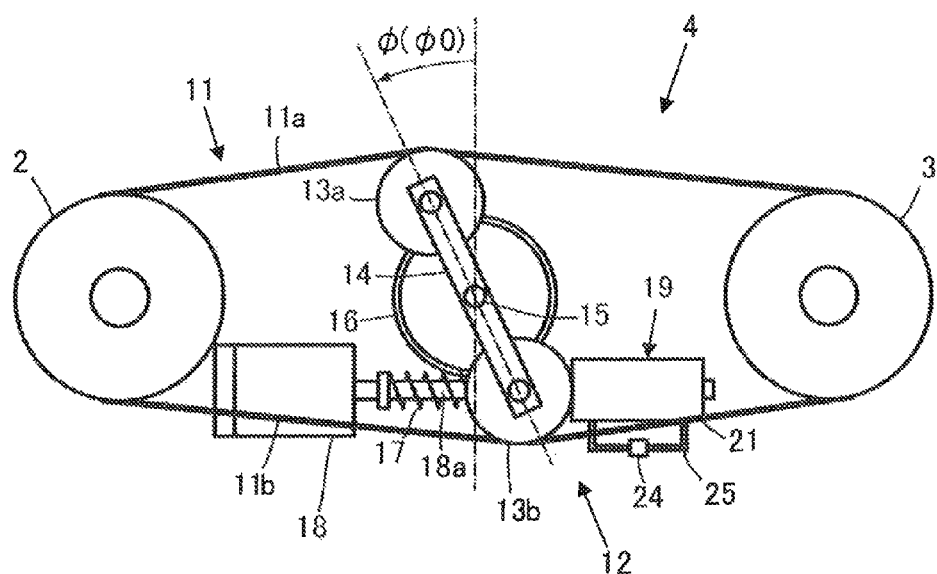
FIG. 6 is a diagram illustrating the configuration of an elastic force generating mechanism of a power transmission device according to another modification.

Further, in the power transmission device 1 according to the embodiment, the rollers 13a and 13b have been pressed against the stretched portions 11a and 11b of the wire 11, the stretched portions 11a and 11b being held between the rollers 13a and 13b. However, as illustrated in, for example, FIG. 6, the rollers 13a and 13b may be pressed against the stretched portions 11a and 11b by holding the rollers 13a and 13b between the stretched portions 11a and 11b of the wire 11.

The alternative configuration is also capable of transmitting power between the two pulleys 2 and 3 in the same manner as that in the embodiment.

Further, in the power transmission device 1, the two rollers 13a and 13b have been provided to be pressed against the stretched portions 11a and 11b of the wire 11. Alternatively, however, the roller 13a may be pressed against only one of the stretched portions 11a and 11b, e.g. only the stretched portion 11a, and the other roller 13b may be omitted. With this alternative arrangement, when, for example, a rotational driving force in the forward rotation direction is imparted to the drive pulley 2 or a rotational driving force in the reverse rotation direction is imparted to the driven pulley 3, an elastic force and a viscous force can be generated between the two pulleys 2 and 3 by the same operation as that in the embodiment.

Further, in the embodiment, the wire 11 has been used as the wire member. Alternatively, however, the wire member may be replaced by a belt-like member.

What is claimed is:

1. A power transmission device adapted to transmit power between a first pulley member and a second pulley member which has a rotational axial center parallel to a rotational axial center of the first pulley member and which is disposed laterally relative to the first pulley member, the power transmission device comprising:

a wire member which is wound around an outer peripheral portion of each of the first pulley member and the second pulley member so as to be tightly stretched between the two pulley members;

a roller member, an outer peripheral portion of which is pressed against the wire member such that the wire member is curved between the two pulley members and which is provided rotatably around a rotational axial center thereof parallel to the rotational axial centers of the two pulley members as the wire member runs;

a supporting member which rotatably supports the roller member and which is provided rotatably around a revolution axial center eccentric from the rotational axial center of the roller member by a predetermined interval;

a rotary gear connected to the supporting member such that the rotary gear is rotatable around the revolution axial center integrally with the supporting member;

a spring worm engaged with the rotary gear; and a first actuator connected to the spring worm so as to allow the amount of rotation of the spring worm to be controlled.

2. The power transmission device according to claim 1, further comprising:
a second actuator which selectively imparts a rotational driving force in a forward rotation direction or a rotational driving force in a reverse rotation direction to the first pulley member,
wherein the wire member is tightly stretched on both sides of the two pulley members in a direction orthogonal to a direction of an interval between the two pulley members,
a first roller member having an outer peripheral portion thereof pressed against the wire member at one side of both sides of the two pulley members and a second roller member having an outer peripheral portion thereof pressed against the wire member at the other side of both sides of the two pulley members are supported as the roller members by the supporting member,
the first roller member and the second roller member are disposed such that the wire member on both sides of the two pulley members is held between the first roller member and the second roller member or the first roller member and the second roller member are held between wire member portions on both sides of the two pulley members, and
the revolution axial center is disposed such that the revolution axial center intersects with a segment that connects the centers of rotation of the first roller member and the second roller member in the case where the first roller member and the second roller member are observed in the direction of the revolution axial center.

3. The power transmission device according to claim 1, further comprising:
a cylinder structure having a cylindrical section, a piston slidably provided in the cylindrical section in the axial direction of the cylindrical section, a pair of liquid chambers which are defined by the piston in the cylindrical section and which are in communication with each other through an orifice, and a viscous liquid sealed in the pair of liquid chambers,
wherein the cylinder structure is disposed such that the axial direction of the cylindrical section is in the same direction in which the spring worm extends or contracts, and
one end and the other end of the spring worm are connected to the piston and the cylindrical section, respectively.

4. The power transmission device according to claim 3, wherein the orifice is configured such that the area of an opening of the orifice is variably controllable.

5. A power transmission device adapted to transmit power between a first pulley member and a second pulley member which has a rotational axial center parallel to a rotational axial center of the first pulley member and which is disposed laterally relative to the first pulley member, the power transmission device comprising:
a wire member which is wound around an outer peripheral portion of each of the first pulley member and the second pulley member so as to be tightly stretched between the two pulley members;
a roller member, an outer peripheral portion of which is pressed against the wire member such that the wire member is curved between the two pulley members and which is provided rotatably on a rotational axial center thereof parallel to the rotational axial centers of the two pulley members as the wire member runs;
a supporting member which rotatably supports the roller member and which is provided rotatably around a revolution axial center eccentric from the rotational axial center of the roller member by a predetermined interval;
a rotary gear connected to the supporting member such that the rotary gear is rotatable around the revolution axial center integrally with the supporting member;
a spring worm engaged with the rotary gear; and
a cylinder structure having a cylindrical section, a piston slidably provided in the cylindrical section in the axial direction of the cylindrical section, a pair of liquid chambers which are defined by the piston in the cylindrical section and which are in communication with each other through an orifice, the area of the opening of which is variably controllable, and a viscous liquid sealed in the pair of liquid chambers,
wherein the spring worm is provided such that the spring worm does not rotate around an axial center thereof, and one end and the other end of the spring worm are connected to the piston and the cylindrical section, respectively.

6. The power transmission device according to claim 5, comprising:
a second actuator which selectively imparts a rotational driving force in a forward rotation direction or a rotational driving force in a reverse rotation direction to the first pulley member,
wherein the wire member is tightly stretched on both sides of the two pulley members in a direction orthogonal to a direction of an interval between the two pulley members,
a first roller member having an outer peripheral portion thereof pressed against the wire member at one side of both sides of the two pulley members and a second roller member having an outer peripheral portion thereof pressed against the wire member at the other side of both sides of the two pulley members are supported as the roller members by the supporting member,
the first roller member and the second roller member are disposed such that the wire member on both sides of the two pulley members is held between the first roller member and the second roller member or the first roller member and the second roller member are held between wire member portions on both sides of the two pulley members, and
the revolution axial center is disposed such that the revolution axial center intersects with a segment that connects the centers of rotation of the first roller member and the second roller member in the case where the first roller member and the second roller member are observed in the direction of the revolution axial center.

* * * * *